US011784583B2

(12) United States Patent
Schweizer et al.

(10) Patent No.: US 11,784,583 B2
(45) Date of Patent: Oct. 10, 2023

(54) CASCADED PULSE WIDTH MODULATION CONVERTER CONTROL

(71) Applicant: ABB Schweiz AG, Baden (CH)

(72) Inventors: Mario Schweizer, Rütihof (CH); Tobias Geyer, Ennetbaden (CH); Ioannis Tsoumas, Zürich (CH)

(73) Assignee: ABB Schweiz AG, Baden (CH)

( * ) Notice: Subject to any disclaimer, the term of this patent is extended or adjusted under 35 U.S.C. 154(b) by 131 days.

(21) Appl. No.: 17/601,312

(22) PCT Filed: Mar. 3, 2020

(86) PCT No.: PCT/EP2020/055583
§ 371 (c)(1),
(2) Date: Oct. 4, 2021

(87) PCT Pub. No.: WO2020/182548
PCT Pub. Date: Sep. 17, 2020

(65) Prior Publication Data
US 2022/0216803 A1 Jul. 7, 2022

(30) Foreign Application Priority Data

Mar. 14, 2019 (EP) .................................. 19162755

(51) Int. Cl.
H02M 7/49 (2007.01)
H02M 1/00 (2006.01)
H02M 7/487 (2007.01)
H02M 7/483 (2007.01)

(52) U.S. Cl.
CPC ............ H02M 7/49 (2013.01); H02M 1/007 (2021.05); H02M 7/483 (2013.01); H02M 7/487 (2013.01)

(58) Field of Classification Search
CPC ....... H02M 1/007; H02M 7/483; H02M 7/487
See application file for complete search history.

(56) References Cited

U.S. PATENT DOCUMENTS

| 5,559,685 | A | * | 9/1996 | Lauw | .................. | H02M 7/4826 |
| | | | | | | 363/37 |
| 5,966,055 | A | * | 10/1999 | Knoedl, Jr. | .......... | H03C 3/0975 |
| | | | | | | 375/279 |
| 6,621,719 | B2 | | 9/2003 | Steimer et al. | | |
| 7,825,540 | B2 | * | 11/2010 | Ogusa | ................. | H02M 1/0095 |
| | | | | | | 307/54 |
| 8,223,517 | B2 | | 7/2012 | Kishida et al. | | |
| 8,611,120 | B2 | | 12/2013 | Okuda et al. | | |
| 8,730,696 | B2 | | 5/2014 | Barbosa | | |
| 9,608,518 | B2 | * | 3/2017 | Yin | ........................ | H02M 3/285 |
| 10,432,088 | B1 | * | 10/2019 | Chang | .................. | H02M 3/157 |
| 2003/0026111 | A1 | * | 2/2003 | Steimer | ............... | H02M 1/0095 |
| | | | | | | 363/16 |
| 2004/0189271 | A1 | * | 9/2004 | Hansson | ........... | H02M 3/33515 |
| | | | | | | 323/283 |
| 2012/0113700 | A1 | * | 5/2012 | Kajouke | ................. | B60L 50/40 |
| | | | | | | 363/127 |
| 2013/0070495 | A1 | * | 3/2013 | Jonsson | ................ | H02M 7/758 |
| | | | | | | 363/84 |
| 2014/0016380 | A1 | | 1/2014 | Barbosa | | |
| 2014/0070787 | A1 | * | 3/2014 | Arno | ....................... | H02M 3/02 |
| | | | | | | 323/304 |
| 2017/0185130 | A1 | | 6/2017 | Zhang et al. | | |
| 2017/0366082 | A1 | * | 12/2017 | Liu | ..................... | H02M 1/4216 |
| 2019/0190397 | A1 | * | 6/2019 | Van-Der-Maerwen | | ...................... |
| | | | | | | H02M 7/49 |
| 2020/0195125 | A1 | * | 6/2020 | Slepchenkov | ...... | H02M 7/4833 |
| 2020/0350847 | A1 | * | 11/2020 | Geyer | .................... | H02P 21/30 |
| 2021/0067057 | A1 | * | 3/2021 | Abarzadeh | .......... | H02M 7/4837 |
| 2022/0247326 | A1 | * | 8/2022 | Lai | ...................... | H02M 1/0095 |
| 2023/0006550 | A1 | * | 1/2023 | Sreenivas | ............. | H02M 1/084 |
| 2023/0018083 | A1 | * | 1/2023 | Kajiyama | ............... | H02M 1/12 |
| 2023/0107678 | A1 | * | 4/2023 | Popek | .................... | H02M 1/08 |
| | | | | | | 363/44 |
| 2023/0111730 | A1 | * | 4/2023 | Scobie | .................... | H02M 1/12 |
| | | | | | | 363/37 |

FOREIGN PATENT DOCUMENTS

| EP | 1253706 B1 | 8/2013 |
| EP | 3174190 A1 | 5/2017 |
| WO | 2018029303 A1 | 2/2018 |
| WO | 2018172329 A1 | 9/2018 |

OTHER PUBLICATIONS

European Patent Office, International Search Report & Written Opinion issued in corresponding Application No. PCT/EP2020/055583, dated Apr. 7, 2020, 11 pp.

European Patent Office, Extended Search Report issued in corresponding Application No. 19162755.3, dated Oct. 1, 2019, 8 pp.

Das et al., "10 kV, 120 A Sic Half H-Bridge Power MOSFET Modules Suitable for High Frequency, Medium Voltage Applications," 2011 IEEE Energy Conversion Congress and Exposition, Sep. 17-22, 2011, Phoenix, Arizona, pp. 2689-2692.

(Continued)

Primary Examiner — Yusef A Ahmed
(74) Attorney, Agent, or Firm — Leydig, Voit & Mayer, Ltd.

(57) ABSTRACT

An electrical converter includes a main converter for generating a first output voltage and a converter cell for converting the first output voltage into a second output voltage. A method for operating an electrical converter includes: receiving a reference voltage for the electrical converter; pulse width modulating the reference voltage with a first modulation frequency for generating a first switching signal for the main converter; switching the main converter with the first switching signal to generate the first output voltage; estimating the first output voltage from the first switching signal; determining a voltage error by subtracting the estimated first output voltage from the reference voltage; pulse width modulating the voltage error with a second modulation frequency, which is higher than the first modulation frequency, for generating a further switching signal for the converter cell; and switching the converter cell with the further switching signal to generate the second output voltage.

18 Claims, 9 Drawing Sheets

(56) References Cited

OTHER PUBLICATIONS

Hadi et al., "Hysteresis Voltage Control of DVR Based on Unipolar PWM," Applications of MATLAB in Science and Engineering, INTECH, Sep. 9, 2011, pp. 83-96.

Lai et al., "High-Voltage High-Frequency Inverter using 3.3kV SiC MOSFETs," 15th International Power and Electronics and Motion Control Conference, EPE-PEMC 2012 ECCE Europe, Novi Sad, Serbia, 5 pp.

Madhusoodhanan et al., "Medium Voltage (≥2.3 kV) High Frequency Three-Phase Two-Level Converter Design and Demonstration using 10 kV SiC MOSFETs for High Speed Motor Drive Applications," 2016 IEEE Applied Power Electronics Conference and Exposition (APEC), Mar. 20-24, 2016, Long Beach, California, pp. 1497-1504.

Madhusoodhanan et al., "Power Loss Analysis of Medium-Voltage Three-Phase Converters Using 15-kV/40-A SiC N-IGBT," IEEE Journal of Emerging and Selected Topics in Power Electronics, vol. 4, No. 3, Sep. 2016, pp. 902-917.

Pulikanti et al., "Hybrid Seven-Level Cascaded Active Neutral-Point-Clamped-Based Multilevel Converter Under SHE-PWM," IEEE Transactions on Industrial Electronics, vol. 60, No. 11, Nov. 2013, pp. 4794-4804.

Silva et al., "Control of an Hybrid Multilevel Inverter for Current Waveform Improvement," 2008 IEEE International Symposium on Industrial Electronics, Jun. 30-Jul. 2, 2008, Cambridge, United Kingdom, pp. 2329-2335.

Ulrich et al., "Floating Capacitor Voltage Regulation in Diode Clamped Hybrid Multilevel Converters," 200 IEEE Electric Ship Technologies Symposium, Apr. 20-22, 2009, Baltimore, Maryland, pp. 197-202.

Yu et al., "Hybrid Seven-Level Converter Based on T-Type Converter and H-Bridge Cascaded Under SPWM and SVM," IEEE Transactions on Power Electronics, vol. 33, No. 1, Jan. 2018, pp. 689-702.

Zhang et al., "Three-Level Two-Stage Decoupled Active NPC Converter with Si IGBT and SiC MOSFET," IEEE Transactions on Industry Applications, vol. 54, No. 6, Nov-Dec. 2018, pp. 5671-5678.

\* cited by examiner

CASCADED PULSE WIDTH MODULATION CONVERTER CONTROL

FIELD OF THE INVENTION

The invention relates to a method for operating an electrical converter as well as to an electrical converter.

BACKGROUND OF THE INVENTION

In medium voltage applications, power converters traditionally operate at rather low switching frequencies in the range of a few hundred Hertz due to the high switching losses of Si-based medium voltage switches such as IGBTs and IGCTs. Recently, the introduction of SiC-based switches with high blocking voltages and possibly fast switching speeds has led to the expectation that these switches may be employed in the near future also in medium voltage converters.

In low voltage applications, there have been significant improvements of SiC MOSFETs with a blocking voltage of up to 1.7 kV. Due to the low commutation loop inductance of 2-level half-bridge modules, very high switching speeds may be feasible and switching frequencies around 24 kHz may become common. However, SiC modules are still more expensive than comparable Si IGBT modules.

U.S. Pat. No. 2,014,016 380 A1 describes a multi-level voltage converter, which includes a multi-point converter circuit and at least one full bridge inverter circuit. The multi-point converter circuit is configured for converting a DC voltage into an intermediate multi-level voltage. The full bridge inverter circuit is electrically connected in series with the multi-point converter circuit and configured for receiving the intermediate multi-level voltage to generate a multi-level output voltage corresponding to a single phase output.

WO 2018/172329 A1 refers to an inverter comprising a first inverter stage having a first switching frequency and a second inverter stage connected to the first inverter stage and having a second switching frequency higher than the first switching frequency. A switching signal for the second inverter stage is generated by calculating a voltage error by subtracting an estimated output voltage of the first inverter stage from a reference voltage for the inverter and pulse width modulating the voltage error with a modulation frequency, which is higher than a modulation frequency for generating a switching signal for the first inverter stage.

WO 2018/029303 A1 relates to a method for controlling a two-level converter system. The method comprises determining, with a first controller stage, an output voltage reference for the converter system, generating, with the first controller stage, switching commands for a main converter based on the output voltage reference, and generating, with a second controller stage, switching commands for a floating converter cell connected to the output of the main converter.

DESCRIPTION OF THE INVENTION

It is an objective of the invention to provide an economical converter with low losses.

This objective is achieved by the subject-matter of the independent claims. Further exemplary embodiments are evident from the dependent claims and the following description.

A first aspect of the invention relates to a method for operating an electrical converter. For example, the method may be performed by a controller of the electrical converter.

A further aspect of the invention relates to an electrical converter, which is adapted and/or configured for performing the method.

The electrical converter comprises a main converter for generating a first output voltage and a converter cell for converting the first output voltage into a second output voltage.

The main converter may be a two-level, three-level and/or multi-level converter, which converts a DC link voltage from a DC link, which may comprise one or more DC link capacitors, into the first output voltage.

It has to be noted that the electrical converter may comprise further converter cells, which are series-connected with each other and with the main converter.

Every such converter cell may comprise a first half-bridge and a second half-bridge, which are parallel-connected with each other via a DC link, which may comprise a DC link capacitor. The (first) converter cell may convert the first output voltage into a second output voltage. A second converter cell may convert the second output voltage into a third output voltage. A third converter cell may convert the third output voltage into a fourth output voltage, etc.

According to an embodiment of the invention, the method comprises: receiving a reference voltage for the electrical converter. The reference voltage may be a scalar in the case of a single-phase converter and may be a two- or three-component vector in the case of a three-phase converter. The vector may be provided in the three-phase (abc) coordinate system or in the stationary orthogonal ($\alpha\beta$ and optional $\gamma$) coordinate system.

The reference voltage may be provided by an outer control loop, which, for example, controls the torque and/or speed of an electrical machine supplied by the electrical converter.

According to an embodiment of the invention, the method comprises: pulse width modulating the reference voltage with a first modulation frequency for generating a first switching signal for the main converter. Pulse width modulation may take place by comparing the voltage reference (or a component thereof) with one or more carrier signals with the modulation frequency. A level of the switching signal may be changed, when the reference voltage intersects the corresponding carrier signal. The first switching signal may be a multi-level switching signal having as many levels as the main converter is designed to generate.

According to an embodiment of the invention, the method comprises: switching the main converter with the first switching signal to generate the first output voltage. The switching signal may be transformed into switch positions of the main converter, which are applied to the switches of the main converter.

According to an embodiment of the invention, the method comprises: estimating the first output voltage from the first switching signal. The first output voltage may be estimated by multiplying the first switching signal with a half of the DC link voltage of the main converter.

According to an embodiment of the invention, the method comprises: determining a voltage error by subtracting the estimated first output voltage from the reference voltage. The voltage error, which depending on the voltage reference also may be a scalar or vector, is indicative of the difference of the desired voltage (the reference voltage) and the generated voltage (the first output voltage). The converter cell is switched in such a way to even more reduce this error.

According to an embodiment of the invention, the method comprises: pulse width modulating the voltage error with a second modulation frequency, which is higher than the first modulation frequency, for generating a further switching signal for the converter cell; and switching the converter cell with the further switching signal to generate the second output voltage.

Pulse width modulation of the voltage error (and of further voltage errors as described below) may take place as described with respect to the reference voltage. The voltage error may be compared with one or more carrier signals of the second modulation frequency and voltage levels for the further switching signal may be determined.

The further switching signal may be used for switching a complete converter cell. In this case, the further switching signals may have two or three levels.

It also may be that the further switching signal is used for solely switching a half-bridge of the converter cell. In this case, the further switching signal may have two levels. The other half-bridge of the converter cell may be switched with an additional switching signal, which may have a different frequency as the first switching signal and the further switching signal.

The second output voltage may be the first output voltage, optionally with the voltage of a DC link of the converter cells added or subtracted. Due to the higher switching frequency of the converter cell, the second output voltage may have a smaller second voltage error compared to the reference voltage. In such a way, there may be lower harmonics in the second output voltage. A large passive filter and/or a complicated active filter may be avoided.

As an example, the second modulation frequency is at least 5 times higher than the first modulation frequency. For example, the first modulation frequency may be lower than 500 Hz and/or the second modulation frequency may be higher than 2.5 kHz.

According to an embodiment of the invention, the reference voltage, when it refers to a three-phase electrical converter, is provided in a stationary orthogonal coordinate system (i.e. the $\alpha\beta$ and optional $\gamma$ system) and is converted into a three-phase (abc) coordinate system. The first switching signal may be generated from the reference voltage in the three-phase coordinate system and the first output voltage may be estimated in the three-phase coordinate system.

The estimated first output voltage may be transformed into the stationary orthogonal coordinate system and the first voltage error may be determined by subtracting the estimated first output voltage from the reference voltage in the stationary orthogonal coordinate system. In particular, when the reference voltage is provided as two-component ($\alpha\beta$) vector, the voltage error may be determined without generating accidentally a common mode component.

According to an embodiment of the invention, the reference voltage comprises a common mode reference voltage component. The common mode (i.e. $\gamma$) component may be provided by the outer control loop. A common mode component not only may be provided with the voltage reference, but also may be added to the voltage error and/or further voltage error. In such a way, additional objectives may be achieved, such as an extension of a linear modulation regime and/or an injection of a fundamental voltage component in a converter cell to balance the converter cell capacitors of different converter cells.

According to an embodiment of the invention, a common mode component is added to the voltage error, which may be in the stationary orthogonal coordinate system.

According to an embodiment of the invention, the electrical converter comprises a second converter cell for converting the second output voltage into a third output voltage. The second converter cell also may be switched based on pulse width modulation, for example with an even higher modulation frequency as the second modulation frequency. Again, this third modulation frequency may be at least 5 times higher than the second modulation frequency.

According to an embodiment of the invention, the method further comprises: estimating the second output voltage from the further switching signal, which is a second switching signal; determining a second voltage error by subtracting the estimated second output voltage from the first voltage error; pulse width modulating the second voltage error with a third modulation frequency, which is higher than the second modulation frequency, for generating a third switching signal for the second converter cell; and switching the second converter cell with the third switching signal to generate the third output voltage. In general, the complete second converter cell may be switched with the second switching signal and the complete third converter cell may be switched with the third switching signal.

According to an embodiment of the invention, the converter cell comprises a first half-bridge for receiving the first output voltage and a second half-bridge for providing the second output voltage. As a further alternative, the half-bridges of a converter cell may be switched with different switching signals, which are based on different modulation schemes. The first half-bridge may be switched with a second switching frequency and the second half-bridge may be switched with a third switching frequency higher (such as 5 times higher) than the second switching frequency.

According to an embodiment of the invention, the method further comprises: generating a second switching signal from the voltage error, wherein the second switching signal is 0, if the voltage error is higher than 0, and the second switching signal is 1, if the voltage error is lower than 0; and switching the first half-bridge with the second switching signal. The second switching signal may be generated with this simple pulse width modulation scheme.

According to an embodiment of the invention, the method further comprises: pulse width modulating the voltage error with an upper carrier signal for generating an upper third switching signal and with a lower carrier signal for generating a lower third switching signal, wherein the upper carrier signal sweeps a positive voltage range and the lower carrier signal sweeps a negative voltage range; selecting the upper third switching signal, if the voltage error is higher than 0, and selecting the lower third switching signal, if the voltage error is lower than 0; switching the second half-bridge with the selected third switching signal for generating the second output voltage.

In such a way, a single converter cell may be switched with two different modulation frequencies. This may have the advantage that solely the half-bridge with the higher switching frequency has to be provided with semiconductor switches having lower switching losses, such as SiC switches.

It has to be noted that the different switching schemes may be combined.

It may be that the electrical converter has a first and a second converter cell, while the complete first converter cell is switched with a second switching signal determined from the first voltage error and that the second converter cell is switched with a third and fourth switching signal determined from a second voltage error, which is the difference of the first voltage error and an estimated second output voltage.

A further aspect of the invention relates to a controller for an electrical converter, which is adapted and/or configured for performing the method as described in the above and in the below. Further aspects of the invention relate to a computer program, which, when being executed by a processor, performs the method as described in the above and the below, and to a computer-readable medium in which such a computer program is stored.

A computer-readable medium may be a floppy disk, a hard disk, an USB (Universal Serial Bus) storage device, a RAM (Random Access Memory), a ROM (Read Only Memory), an EPROM (Erasable Programmable Read Only Memory) or a FLASH memory. A computer-readable medium may also be a data communication network, e.g. the Internet, which allows downloading a program code. In general, the computer-readable medium may be a non-transitory or transitory medium.

For example, the controller may comprise a processor and a memory, in which such a computer program is stored and which may be executed by the processor. It has to be noted that the method at least partially may be implemented in hardware, such as in a DSP and/or FPGA.

It has to be understood that features of the method as described in the above and in the following may be features of the computer program, the computer-readable medium and the electrical converter as described in the above and in the following, and vice versa.

The electrical converter and/or the main converter may be a medium voltage converter, i.e. a converter that may be adapted for processing voltages of more than 1 kV.

The electrical converter furthermore may comprise a controller adapted for performing the method as described above and below, such that the main converter is switched by a first switching signal modulated with the first modulation frequency and such that the at least one converter cell is switched by the further switching signal modulated with the second modulation frequency.

According to an embodiment of the invention, the main converter is a two-level converter. The switching signal for a two-level converter may have two levels, such as 0 and 1. For example, the two-level converter may comprise a half-bridge connected in parallel with a DC link.

According to an embodiment of the invention, the main converter is a three-level converter. The switching signal for a three-level converter may have three-levels, such as −1, 0 and 1.

For example, the main converter may be a three-level neutral point clamped converter, which may comprise two series-connected half-bridges, which are connected in parallel to a split DC link and which midpoints are connected via a third half-bridge. The midpoint of the third half-bridge may be connected to a midpoint of the split DC link.

According to an embodiment of the invention, the main converter is a three-level T-type converter, which comprises a half-bridge, which is connected in parallel to a split DC link. The midpoint of the half-bridge may be connected via a bidirectional switch with a midpoint of the split DC link.

According to an embodiment of the invention, the electrical converter comprises a converter cell with a first half-bridge and a second half-bridge, which are interconnected via a DC link. All converter cells of the converter may be designed in this way. A half-bridge may comprise two semiconductor switches, which are series-connected.

According to an embodiment of the invention, the first half-bridge of the converter cell is switched with a second switching signal and the second half-bridge of the converter is switched with a third switching signal. It may be that the first half-bridge is switched with a lower switching frequency than the second half-bridge. This may be beneficial, when the switches of the second half-bridge have lower switching losses as the ones of the first half-bridge.

According to an embodiment of the invention, the first half-bridge comprises Si semiconductor switches, such as IGBTs and/or IGCTs and/or the second half-bridge comprises SiC semiconductor switches, such as MOSFETS. With this design, the lower switching losses of the SiC semiconductor switches may be utilized.

According to an embodiment of the invention, the electrical converter comprises a first converter cell and a second converter cell, each of which comprises a first half-bridge and a second half-bridge, which are interconnected via a DC link. It also is possible that the electrical converter comprises series-connected converter cells, which are switched with switching signals of different frequencies. The first converter cell may be switched with a second switching signal and the second converter cell may be switched with a third switching signal, with a higher switching frequency as the second switching signal. This may be beneficial, when the switches of the third converter cell have lower switching losses as the ones of the second half-bridge.

According to an embodiment of the invention, the first converter cell comprises (solely) Si semiconductor switches and the second converter cell comprises (solely) SiC semiconductor switches.

According to an embodiment of the invention, the main converter is a three-phase converter with three main converter phase outputs, wherein at least one converter cell is connected to every main converter output and provides a converter cell phase output. At every phase output of the main converter, one or more series-connected converter cells may be connected. The series-connected converter cells of every phase may be switched with different switching frequencies as described above and below.

In this case, the reference voltage, the voltage error(s), the switching signals, etc. may be vectors, which have a component in each phase.

According to an embodiment of the invention, the converter cell phase outputs are connected to a passive filter. A passive and/or sine filter may comprise inductors connected into the outputs and/or capacitors interconnecting the outputs, for example via a star- or delta-connection. Due to the increased switching frequency, a low cost passive filter may be used, since its components may have a lower inductivity and/or capacity. A cost reduction of the passive filter may overcompensate an increased cost of SiC semiconductor switches.

According to an embodiment of the invention, the converter cell phase outputs are connected with an electrical machine with three galvanically separated windings, which are connected via a further converter. With the high switching frequency, such an electrical drive may have rather low switching losses. The further converter also may be designed with SiC switches.

These and other aspects of the invention will be apparent from and elucidated with reference to the embodiments described hereinafter.

BRIEF DESCRIPTION OF THE DRAWINGS

The subject-matter of the invention will be explained in more detail in the following text with reference to exemplary embodiments which are illustrated in the attached drawings.

The reference symbols used in the drawings, and their meanings, are listed in summary form in the list of reference symbols. In principle, identical parts are provided with the same reference symbols in the figures.

DETAILED DESCRIPTION OF EXEMPLARY EMBODIMENTS

Figure 1:
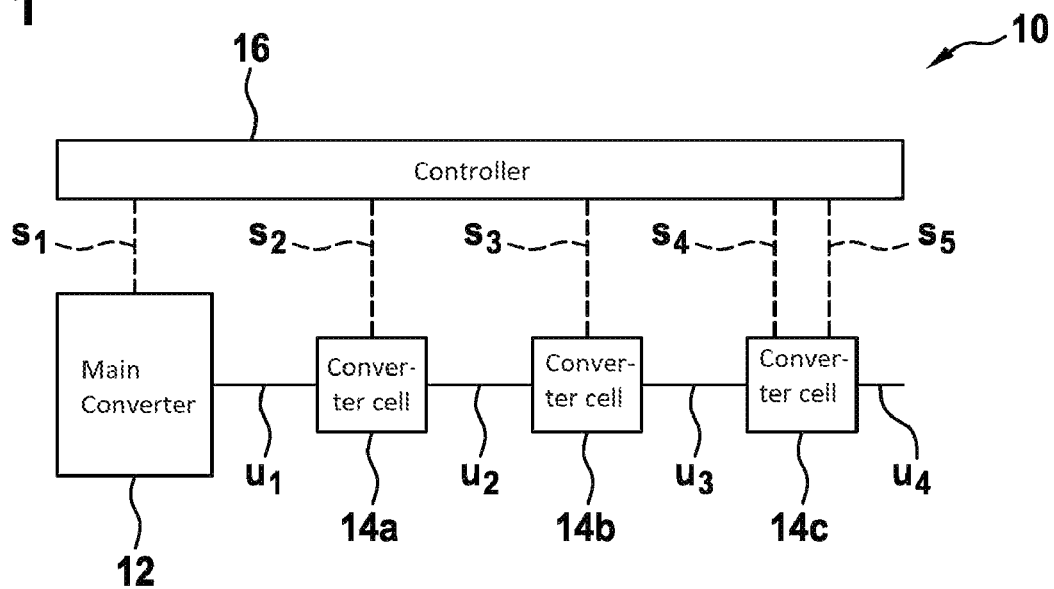
FIG. 1 schematically shows an electrical converter according to an embodiment of the invention.

FIG. 1 shows an electrical converter 10, which is composed of a main converter 12 and series-connected converter cells 14a, 14b, 14c. It may be that the converter 10 comprises solely one converter cell 14a, two converter cells 14a, 14b and more than three converter cells.

The electrical converter 10 furthermore comprises a controller or modulator 16, which generates switching signals $s_1$, $s_2$, $s_3$, $s_4$, $s_5$ for the main converter 12 and the respective converter cells 14a, 14b, 14c.

The main converter generates, for example from a DC voltage, a first output voltage $u_1$ when switched by the switching signal $s_1$. The first output voltage $u_1$ is supplied to the first converter cell 14a, which, when switched by the switching signal $s_2$, generates the second output voltage $u_2$. The second output voltage $u_2$ is supplied to the second converter cell 14b, which, when switched by the switching signal $s_3$, generates a third output voltage $u_3$.

As will be described below, the switching signals $s_1$, $s_2$, $s_3$, $s_4$, $s_5$ may be generated with pulse width modulation, wherein the modulation frequencies for the switching signals may increase. In such a way, also the frequencies of the output voltages $u_1$, $u_2$, $u_3$, to may increase.

FIG. 1 shows that a converter cell 14c may be switched by two switching signals $s_4$, $s_5$, as will be described in more detail with respect to FIG. 5C. The third output voltage $u_3$ may be supplied to the third converter cell 14c, which, when switched by the switching signals $s_4$, $s_5$, generates a fourth output voltage $u_4$.

It has to be noted that the converter cells 14a and/or 14b may be left out and that the main converter 12 may be directly connected to the converter cell 14c, which is supplied by the two switching signals $s_4$, $s_5$. It also may be that one or more converter cells are connected to the converter cells 14c on the side opposite to the main converter 12.

Figure 2A:
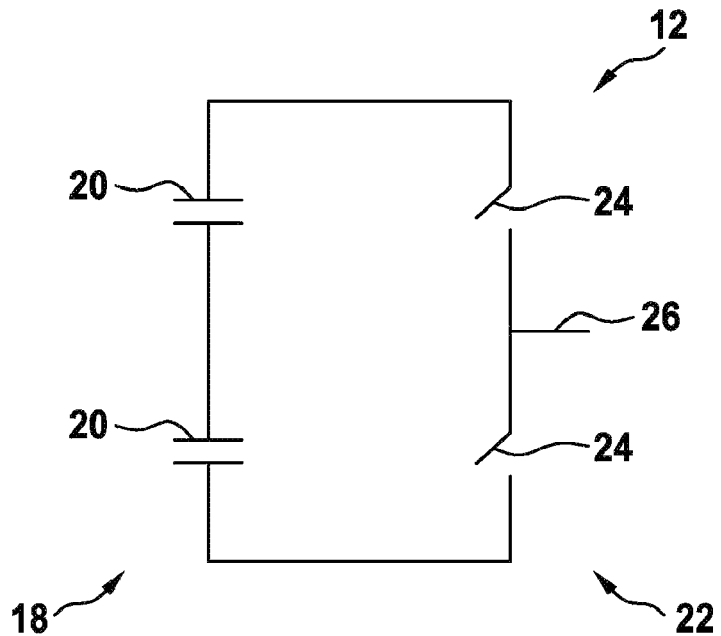
FIG. 2A schematically shows a main converter for the electrical converter of FIG. 1.

FIG. 2A shows an example of the main converter 12. The main converter 12 may be a two-level converter with a single DC link 18 composed of series-connected capacitors 20. The DC link 18 is connected in parallel with a half-bridge 22, which is composed of two series-connected semiconductor switches 24. The output of the main converter 12 is provided by a midpoint 26 between the switches 24.

Figure 2B:
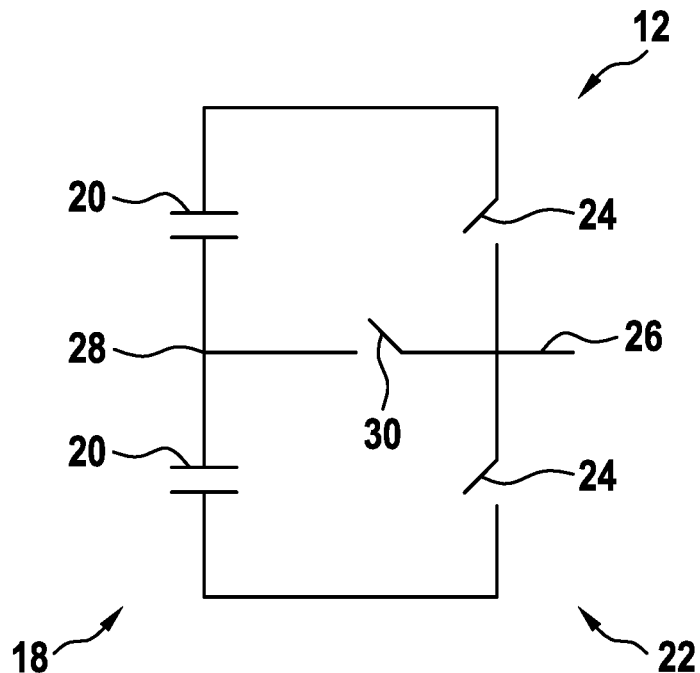
FIG. 2B schematically shows a further type of the main converter for the electrical converter of FIG. 1.

FIG. 2B shows a further example of the main converter 12, in the form of three-level, neutral point piloted and/or T type converter. Additionally to the main converter 12 of FIG. 2B, the main converter of FIG. 2B has a split DC link 18, wherein a midpoint 28 of the DC link 18 is connected via a bidirectional switch 30 with the midpoint 26 of the half-bridge 22.

Figure 2C:
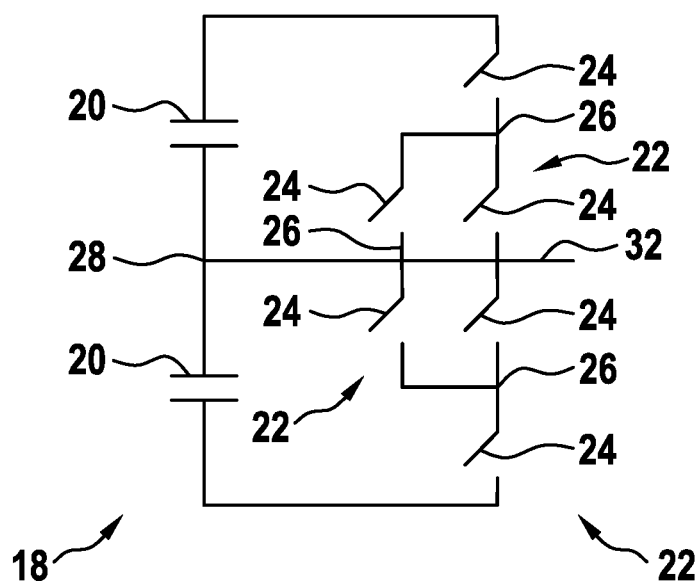
FIG. 2C schematically shows a further type of the main converter for the electrical converter of FIG. 1.

FIG. 2C shows a main converter 12 in the form of a three-level, active neutral point clamped converter. Two series-connected half-bridges 22 are connected in parallel to a split DC link and provide the output 32 of the converter between them. The midpoints 26 of the half-bridges are interconnected via a third half-bridge 22, which midpoint 26 is directly connected to the midpoint 28 of the DC link 18.

Figure 3A:
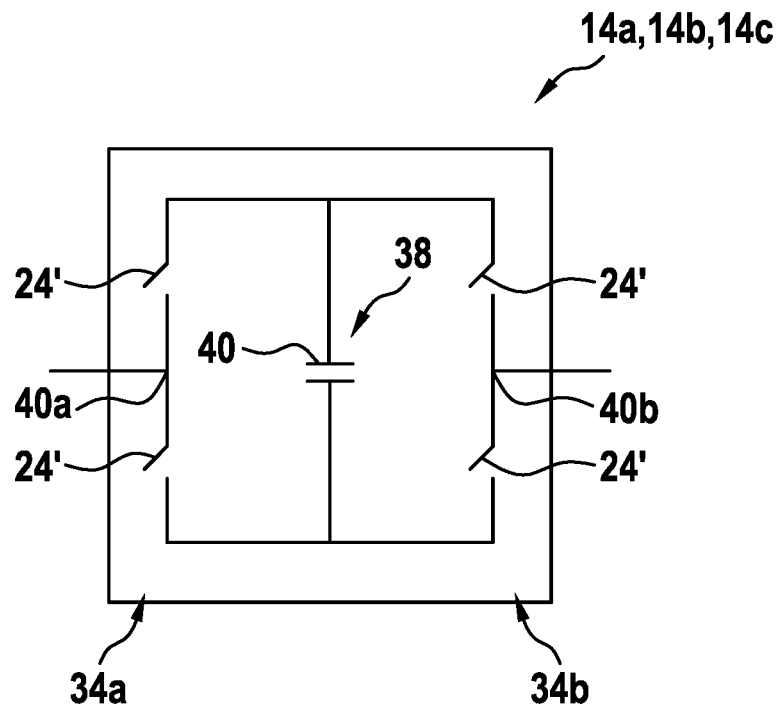
FIG. 3A schematically shows a converter cell for the electrical converter of FIG. 1.

FIG. 3A shows a converter cell 14a, 14b, 14c, which comprises a first half-bridge 34a, a DC link 38 (with a capacitor 40) and a second half-bridge 34b connected in parallel. The midpoint 40a of the first half-bridge 34a may be connected to the output of the main converter 12 or to a preceding converter cell. The midpoint 40b of the second half-bridge 34b may be connected to a succeeding converter cell or may provide an output of the electrical converter 10.

The switches 24' of the half-bridges 34a, 34b may comprise Si-based semiconductor switches, such as Si IGBTs or Si IGCTs. Also the main converter 12 may have switches 24 of this type. However, it also may be that all of the switches 24' of the converter cell 14a, 14b, 14c comprise SiC-based semiconductor switches, such as SiC MOSFETs.

Figure 3B:
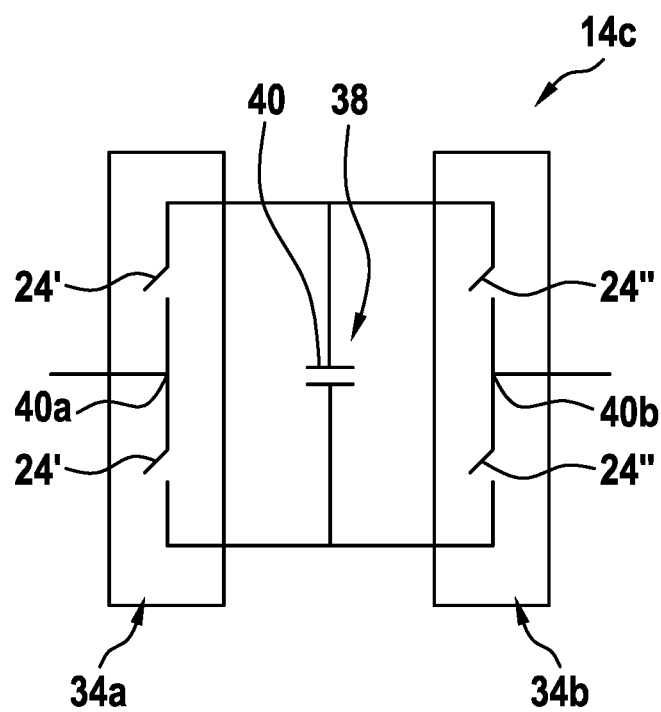
FIG. 3B schematically shows a further type of the converter cell for the electrical converter of FIG. 1.

FIG. 3B shows a converter cell 14c, which has the same circuit design as the one of FIG. 3A, however, where the switches 24' of the first half-bridge 34a comprise Si-based semiconductor switches and the switches 24" of the second half-bridge 34b comprise SiC-based semiconductor switches. The converter cell 14c of FIG. 3A may be composed of two modules and/or may be seen as a hybrid cell.

FIGS. 1 to 2C relate to single-phase electrical converters 10. The following FIGS. 4 to 6B relate to three-phase electrical converters 10.

Figure 4:
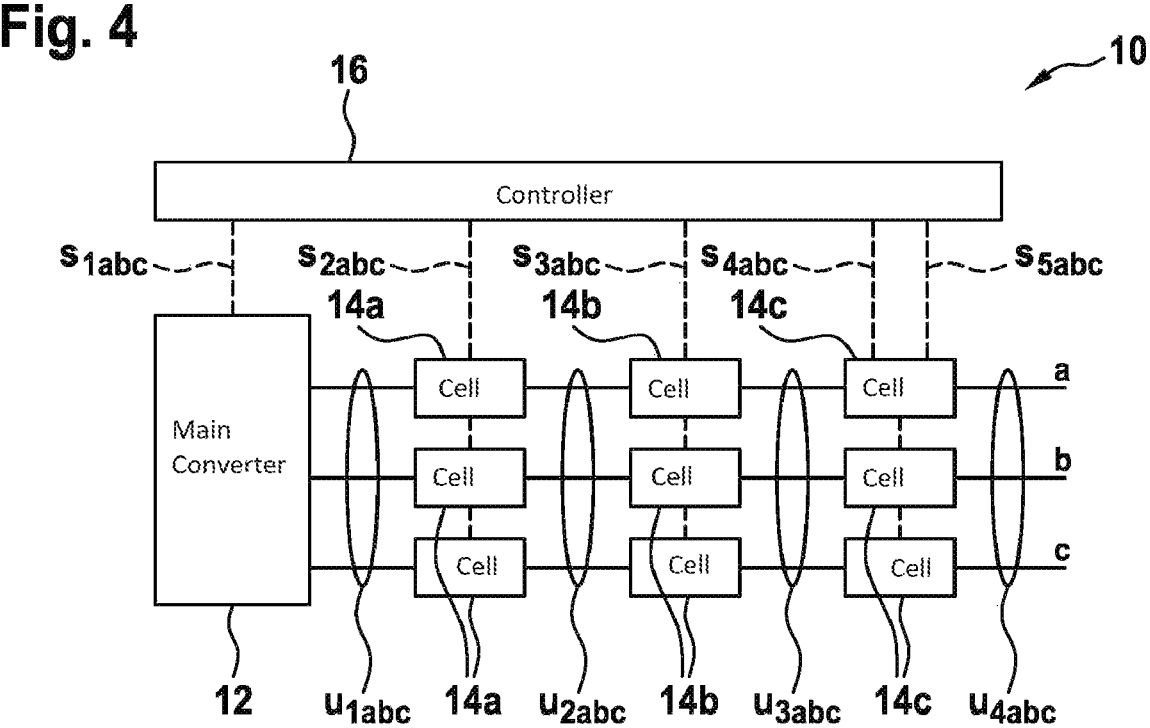
FIG. 4 schematically shows an electrical converter according to a further embodiment of the invention.

FIG. 4 corresponds to FIG. 1 and shows an electrical converter 10, which comprises a main converter 12 with three phase outputs. To each of these outputs three series-connected converter cells 14a, 14b, 14c are connected.

For the electrical converter 10 of FIG. 4, all quantities may be seen as vector-valued. The controller 16 generates switching signals $s_{1abc}$, $s_{2abc}$, $s_{3abc}$, $s_{4abc}$, $s_{5abc}$ for the phases a, b, c of the main converter 12 and the respective converter cell 14a, 14b, 14c of the respective phase. The corresponding output voltages are $u_{1abc}$, $u_{2abc}$, $u_{3abc}$, $u_{4abc}$.

Figure 5A:
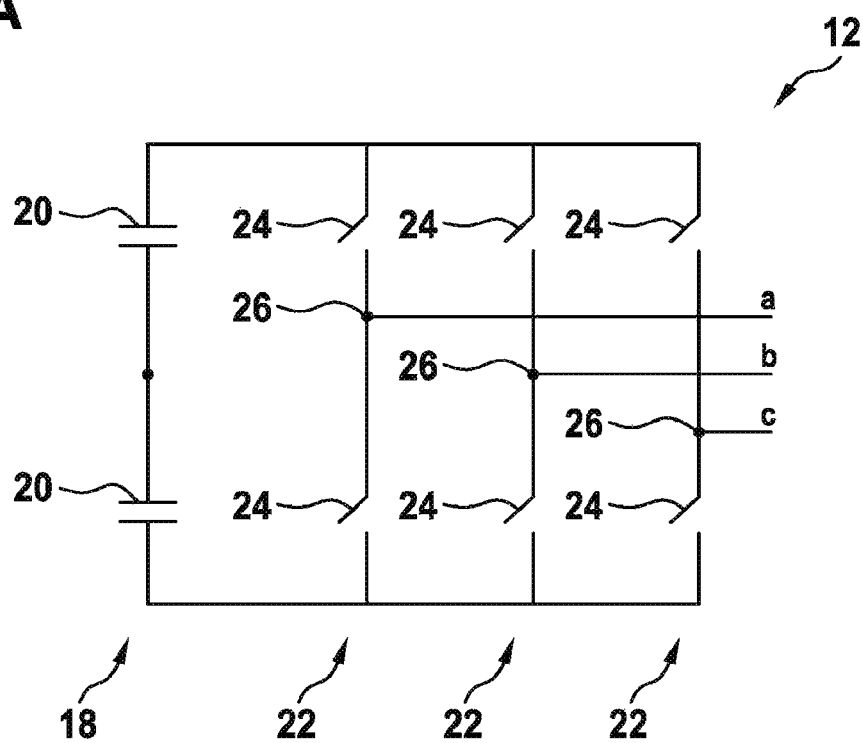
FIG. 5A schematically shows a main converter for the electrical converter of FIG. 4.

FIG. 5A corresponds to FIG. 2A and shows a main converter, which is a three-phase two-level converter with three half-bridges 22 connected in parallel to a DC link 18.

Figure 5B:
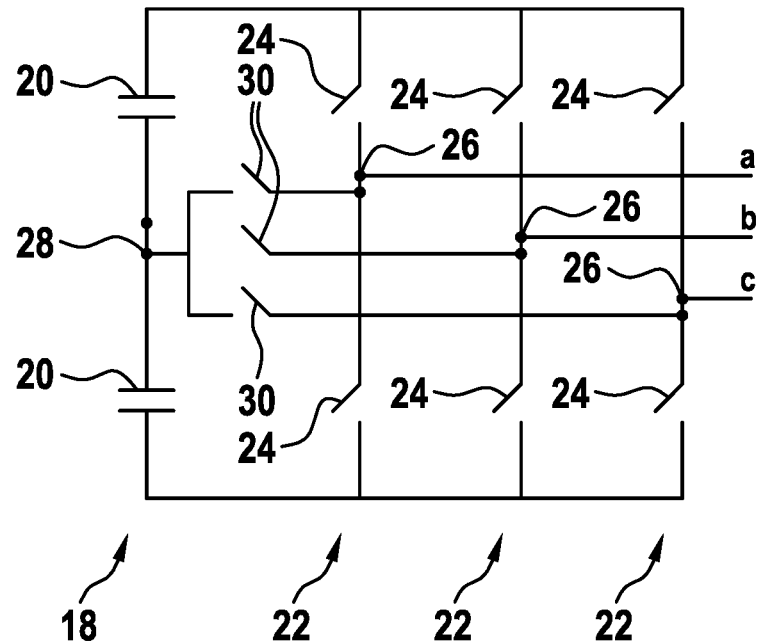
FIG. 5B schematically shows a further type of the main converter for the electrical converter of FIG. 4.

FIG. 5B corresponds to FIG. 2B and shows a main converter, which is a three-phase three-level, neutral point piloted and/or T type converter with three circuits as described with respect to FIG. 2B connected in parallel to a split DC link 18.

Figure 5C:
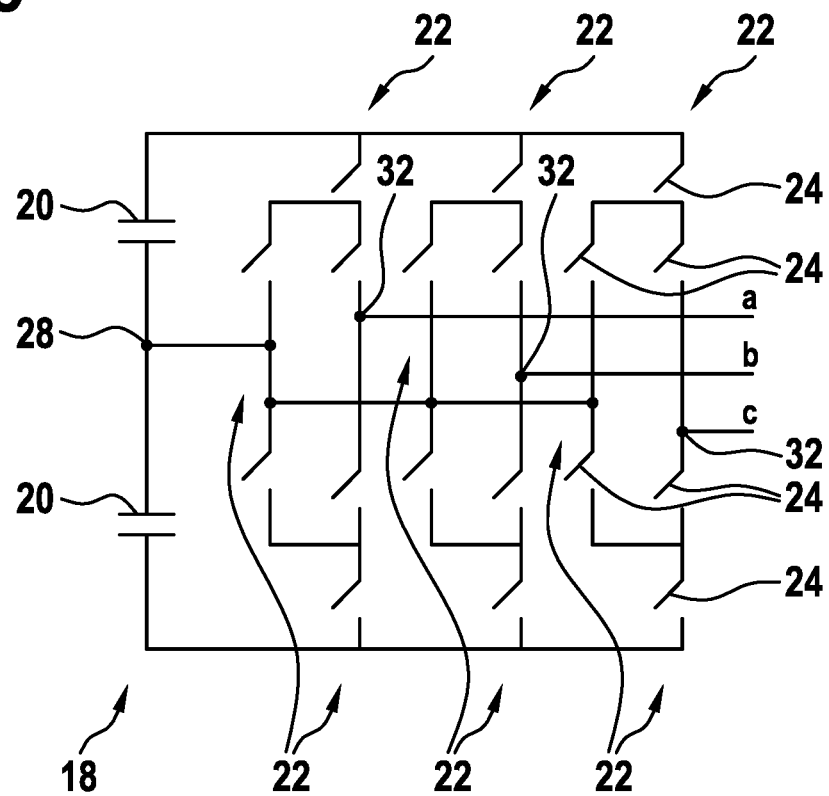
FIG. 5C schematically shows a further type of the main converter for the electrical converter of FIG. 4.

FIG. 5C corresponds to FIG. 2C and shows a main converter, which is a three-phase three-level, active neutral point clamped converter with three circuits as described with respect to FIG. 2C connected in parallel to a split DC link 18.

Figure 6A:
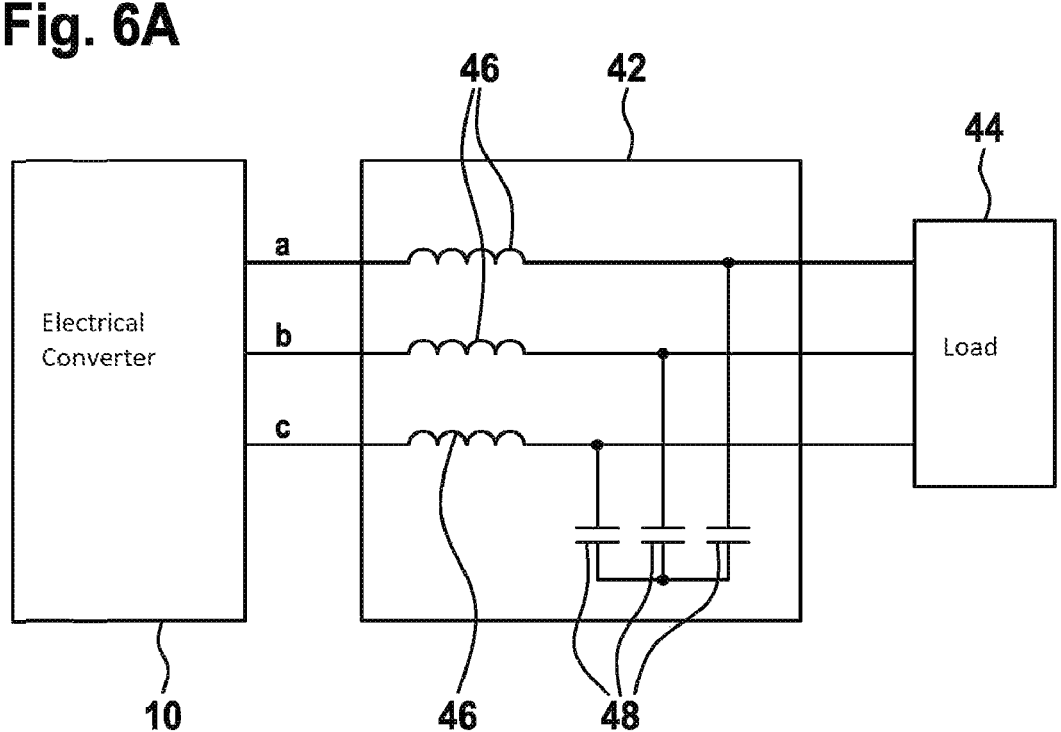
FIG. 6A schematically shows a filter connectable to the electrical converter of FIG. 4.

FIG. 6A shows that a passive filter 42 may be connected between the electrical converter 10 and a load 44. The passive filter 42 may comprise an inductor 46 in each phase interconnecting the electrical converter 10 and the load 44. Furthermore, the passive filter 42 may comprise capacitors 48 interconnecting the phases, for example via a star-connection.

In general, with the method described herein, the main converter 12 may be designed to operate at low switching frequencies, since it does not have to perform an active damping of the filter 42. For example, active damping may be accomplished with the converter cells 14a, 14b, 14c.

Due to the high switching frequency of SiC half-bridges, the filter 42 may be designed at a higher resonance frequency, requiring smaller passive components. Particularly the converter side inductance may be significantly reduced. Inductors usually applied in dv/dt filter or EMC filter circuits may be sufficient to build a sine filter.

The smaller filter capacitors 48 are less likely to cause problems related to interferences with the load 44, such as self-excitation in case of use with motors, or excitation of grid harmonics in case of grid connection.

Figure 6B:
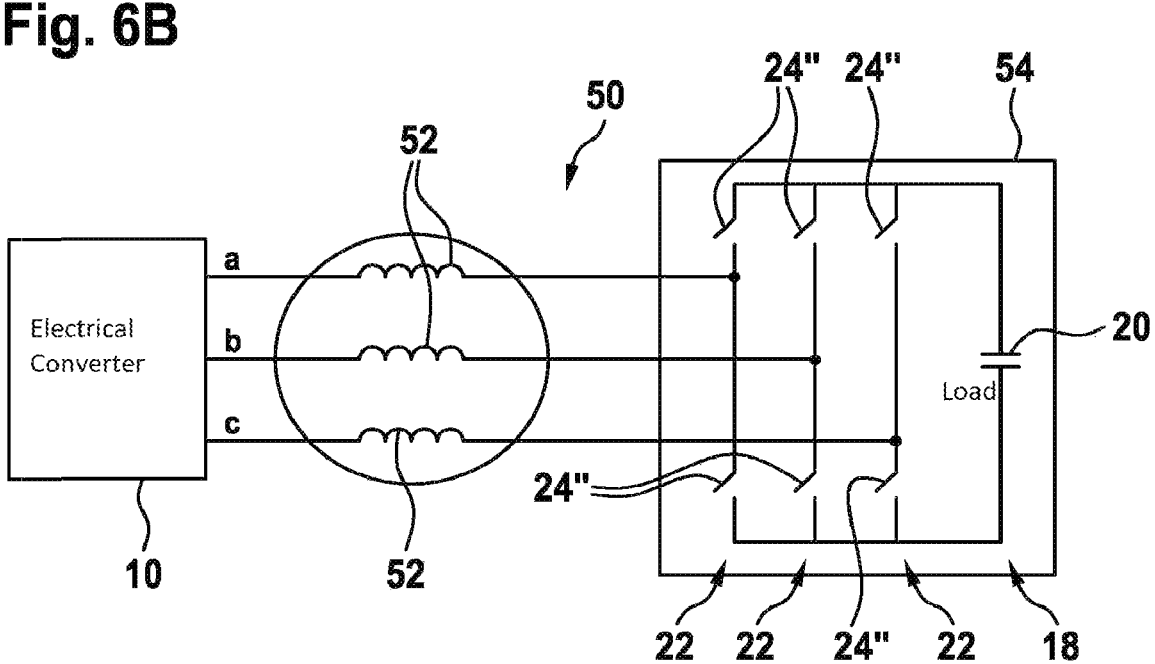
FIG. 6B schematically shows an electrical machine connectable to the electrical converter of FIG. 4.

FIG. 6B shows that an electrical machine 50 with three galvanically separated windings 52 may be connected to the electrical converter 10. On the side opposite to the electrical converter 10, the windings 52 may be connected via a further converter 54, which may be a two-level converter as designed like the converter shown in FIG. 5A. The converter 54 may comprise SiC switches 24".

Figure 7:
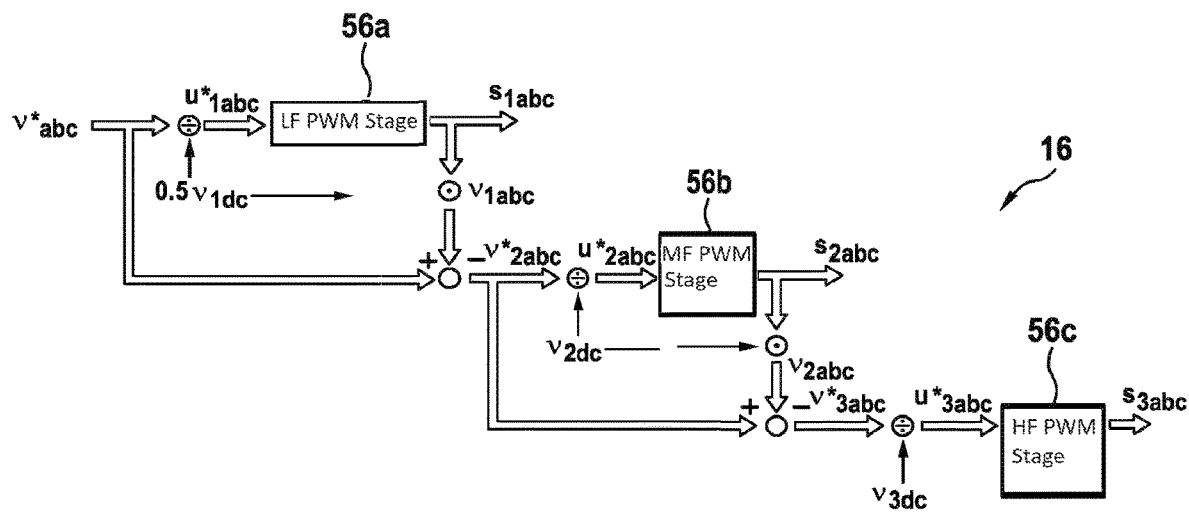
FIG. 7 shows a diagram illustrating a controller and a method for controlling an electrical converter according to an embodiment of the invention.

FIG. 7 shows a diagram illustrating a controller 16 and a method for controlling the electrical converter 10 as described with respect to the previous figures.

To achieve very low harmonic distortions, the method employs a modulation technique, which may be called "sequential filtering" or "repetitive filtering". Sequentially derived switching signals $s_{1abc}$, $s_{2abc}$, $s_{3abc}$ of different switching frequencies are derived with the method. In the following, instead of a scalar signals, vector-valued signals are considered. All quantities in the following have components with respect to the phases a, b and c. In the scalar case, only one component has to be considered and, for example, the switching signals would be $s_1$, $s_2$, $s_3$.

The three switching signals $s_{1abc}$, $s_{2abc}$, $s_{3abc}$ are produced by a low-frequency pulse width modulation stage 56a, a medium-frequency pulse width modulation stage 56b, and a high-frequency pulse width modulation stage 56c.

The low-frequency switching signal $s_{1abc}$, which may have been generated with a carrier signal of 50-250 Hz, is applied to the main converter 12.

The medium-frequency switching signal $s_{2abc}$, which may have been generated with a carrier signal of 350-1 kHz, is applied to the first converter cell 14a.

The high-frequency switching signal $s_{3abc}$, which may have been generated with a carrier signal of about 20 kHz, is applied to the second converter cell 14b.

Further pulse width modulation stages for further converter cells 14c may be included. In the following it is assumed that the converter 10 has two stages of converter cells 14a, 14b.

As already mentioned, it is beneficial to use different types of semiconductor switches 24, 24', 24" in the different converter and filtering stages. For example, in the main converter 12, one may use semiconductor switches 24 with high blocking voltages, comparatively high switching losses and preferably low conduction losses, such as IGCTs or high-voltage IGBTs. It is advantageous to operate these switches 24 at low switching frequencies, such as 50-250 Hz.

In the first converter cell 14a, Si-based IGBTs may be used with a medium switching frequency of around 350 Hz-1 kHz. In the second converter cell 14b, SiC-based switches 24' may be used, enabling high switching frequencies of about 20 kHz. Using such a high switching frequency for the second converter cell 14b allows one to design an LC sine filter 42 with very small and low-cost inductors 46. The corresponding resonance frequency $f_{res}$ can be designed to be as high as 6 kHz. The current control bandwidth may be very high and active damping also may be easily implemented, if needed.

Returning to FIG. 7, the controller 16 receives a three-phase reference voltage $v^*_{abc}$ with the phases a, b and c. The reference voltage $v^*_{abc}$ may be provided by a current controller. During steady-state operation, the reference voltage $v^*_{abc}$ is usually a sinusoidally varying quantity.

The reference voltage $v^*_{abc}$ is divided by half the total DC link voltage $v_{1dc}$ of the main converter 12, to scale it. The resulting three-phase modulating signal $u^*_{1abc}$ may be then scaled to the range $[-1\ 1]^3$. It is fed to the first pulse width modulation stage 56a, which produces the three-phase switching signal $s_{1abc}$, which in the case of a three-level main converter 12 may have the levels/values −1, 0 and −1. The low-frequency modulation stage 56a may operate at a very low pulse number, for example with fundamental frequency switching, or with a pulse width modulation with a low pulse number.

The three-phase terminal voltage of the main converter 12 is $u_{1abc}$. This voltage can be either measured or reconstructed based on the DC link voltage via, for example by multiplying the switching signal $s_{1abc}$ with half of the DC link voltage $v_{1dc}$. The difference between the reference voltage $v^*_{abc}$ and the estimated main converter voltage $v_{1abc}$ is the (first) voltage error $v^*_{2abc}=v^*_{1abc}-v_{1abc}$.

The voltage error $v^*_{2abc}$ is scaled by the capacitor voltage $v_{2dc}$ of the first converter cell 14a and is fed to the second pulse width modulation stage 56b. The second pulse width modulation stage 56b produces the three-phase switching signal $s_{2abc}$ with levels −1, 0 and 1 for the switches 24' in the first converter cell 14a.

It also may be that the second pulse width modulation stage 56b evenly distributes the switching signals to the two half-bridges 34a, 34b of the converter cell 14a. This may be done, for example, by using two carriers for the modulation of the converter cell switches 24'. The carriers may be phase shifted by 180°.

The switching frequencies of both half-bridges 34a, 34b in the converter cell 14a may be equal and the switching losses may be evenly distributed between the two half-bridges 34a, 34b.

The three-phase terminal voltage after the first converter cells 14a is $u_{2abc}$. The difference of this voltage with respect to the first voltage $u_{1abc}$ may again be either measured or reconstructed based on the DC link voltage $v_{2dc}$ of the first converter cell 14a, for example by multiplying the switching signal $s_{2abc}$ with the DC link voltage $v_{2dc}$. The difference between the first voltage error $v^*_{2abc}$ and the second estimated converter cell voltage $v_{2abc}$ is the second voltage error $v^*_{3abc} = v^*_{2abc} - v_{2abc}$.

The second voltage error $v^*_{3abc}$ is scaled by the capacitor voltage $v_{3dc}$ of the second converter cell 14b and is fed to the third pulse width modulation stage 56c. The third pulse width modulation stage 56c produces the three-phase switching signal $s_{3abc}$ with levels −1, 0 and 1 for the switches 24' in the second converter cell 14b.

The objective of the third modulation stage may be to nearly remove the third voltage error $v^*_{3abc}$. The principle may be the same as for the second modulation stage, yielding a three-phase switching signal $s_{3abc}$ with the components −1, 0 and 1 for the switches 24' in the second converter cell 14b.

In FIG. 7, the reference voltage $v^*_{abc}$ and the voltage errors $v^*_{2abc}$, $v^*_{3abc}$ are divided by scalar quantities to obtain the modulating signals $u^*_{1abc}$, $u^*_{2abc}$, $u^*_{3abc}$. These scalar quantities may be different from the nominal (or actual) DC link voltages. For example, if the DC link voltage $v_{2dc}$ of the first converter cell 14a is rather small, it may be beneficial to scale $u^*_{2abc}$ with a value that is larger than $v_{2dc}$ to avoid the second pulse width modulation stage 56b entering a nonlinear modulation regime. A corresponding increase in the residual error may be compensated by the subsequent third pulse width modulation stage 56c.

Figure 8:
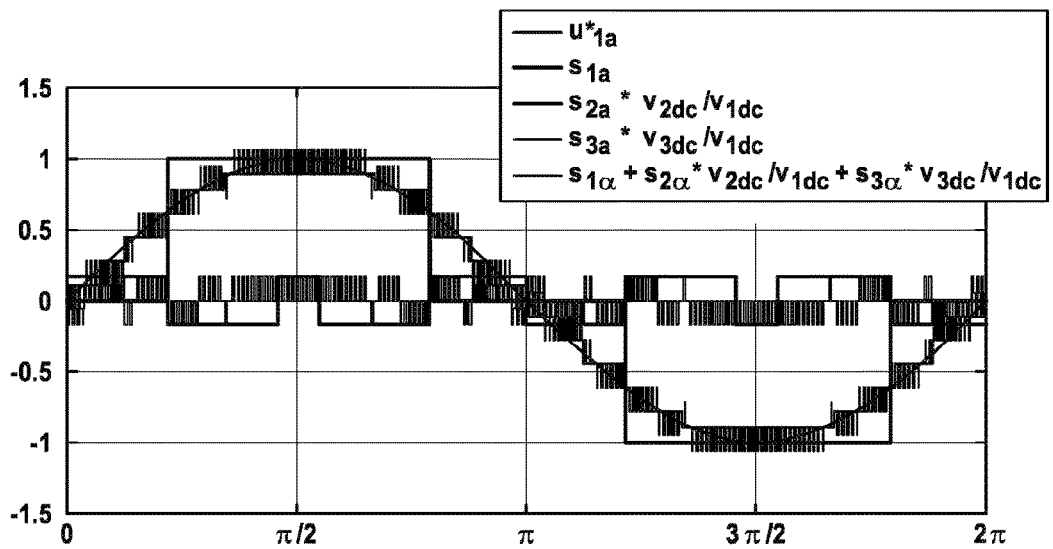
FIG. 8 shows a diagram with output voltages produced by an electrical converter according to an embodiment of the invention.

FIG. 8 shows a diagram with the a-component of the modulation signal $u^*_a$, i.e. the scaled reference voltage $v^*_a$, and scaled switching signals $s_{1a}$, $s_{2a}$, $s_{3a}$. Furthermore, the sum of the scaled switching signals is shown, which can be compared to the original modulation signal $u^*_a$. All signals are shown over one fundamental period of the voltage.

The controller shown in FIG. 7 may be designed to minimize a differential-mode and a common-mode voltage error, which is the difference between the reference voltage $v^*_{abc}$ and the output voltage $u_{2abc}$ at the terminals of the second converter cell 14b.

Figure 9:
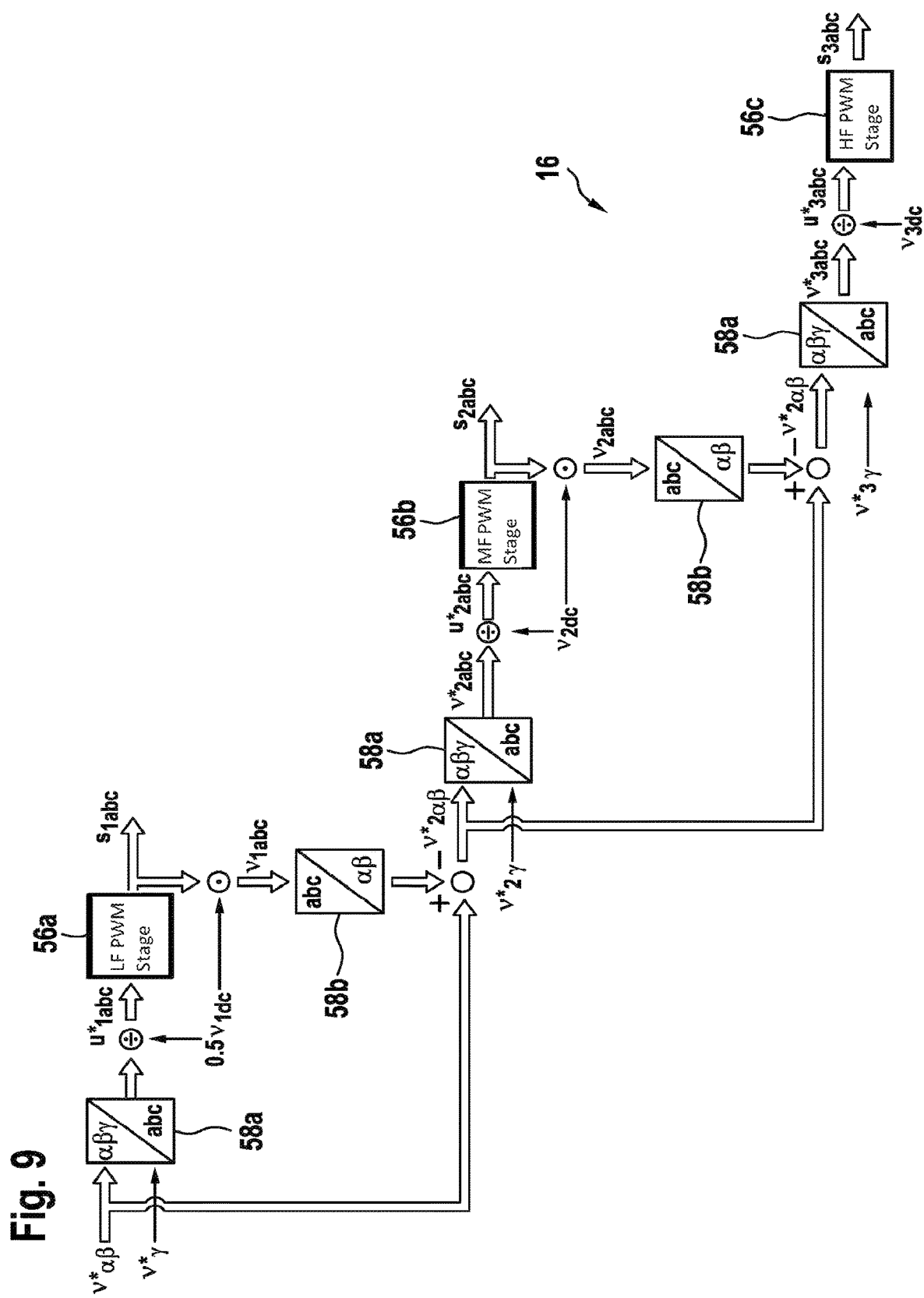
FIG. 9 shows a diagram illustrating a controller and a method for controlling an electrical converter according to a further embodiment of the invention.

In FIG. 9, a controller 16 is shown, which may be designed to only minimize the differential-mode component of this error, by considering the voltage error in the stationary orthogonal (αβ) coordinate system.

The reference voltage $v^*_{\alpha\beta}$ may be provided in the stationary orthogonal (αβ) coordinate system and transformed by an inverse Clark transformation (performed by block 58a) in the three-phase (abc) coordinate system. After that it may be processed like described with respect to FIG. 7 and the pulse width modulation stage 56 may generate the first switching signal slab. The estimated voltage $v_{1abc}$ can be transformed back with a Clark transformation (performed by block 58b) into the stationary orthogonal (αβ) coordinate system and the voltage error $v^*_{2\alpha\beta}$ can be determined by subtracting the estimated voltage $v_{1\alpha\beta}$ from the reference voltage $v^*_{\alpha\beta}$.

The same transformations can be performed with respect to the second pulse width modulation stage 56b.

It is also possible that common-mode components $v^*_\gamma$, $v^*_{2\gamma}$, $v^*_{2\gamma}$ are added to each modulation stage 56a, 56b, 56c in order to achieve additional objectives, such as an extension of the linear modulation regime or the injection of fundamental voltage components in the converter cells 14a, 14b to balance the converter cell DC links 38.

In particular, the reference voltage $v^*_{\alpha\beta}$ may comprise a common-mode component $v^*_\gamma$, which is provided by an external controller. Also, to the first voltage error $v^*_{2\alpha\beta}$, a common-mode component $v^*_{2\gamma}$ may be added and/or to the second voltage error $v^*_{3\beta\alpha}$, a common-mode component $v^*_{3\gamma}$ may be added.

Figure 10:
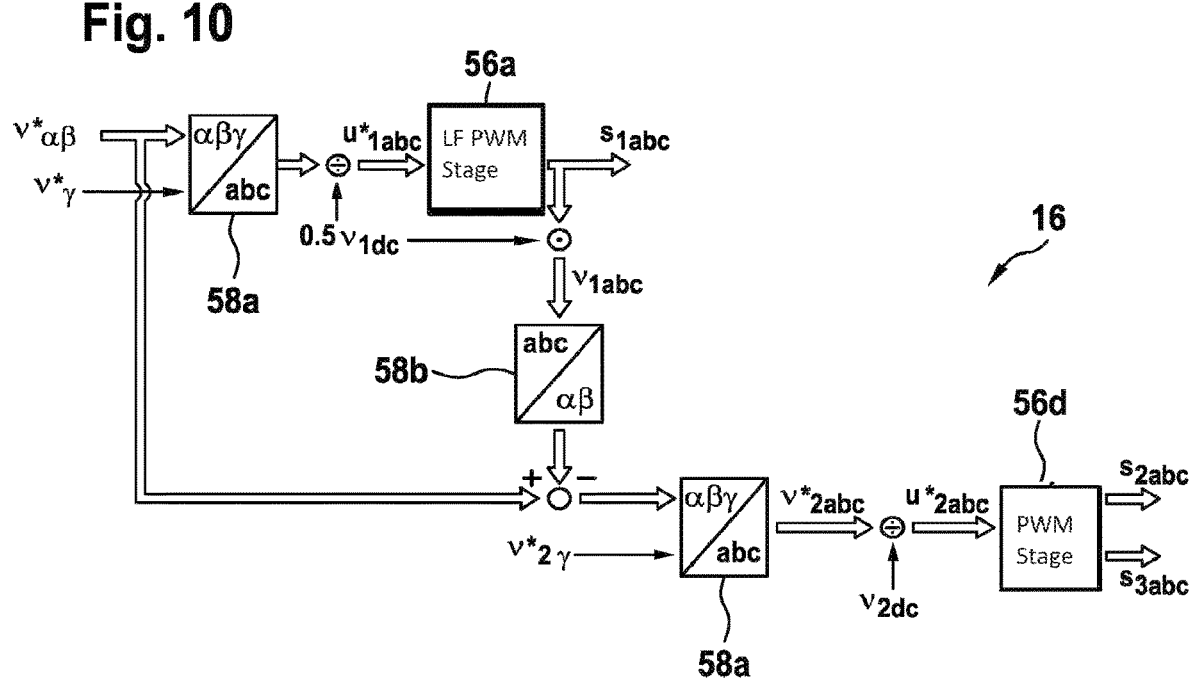
FIG. 10 shows a diagram illustrating a controller and a method for controlling an electrical converter according to a further embodiment of the invention.
Figure 11:
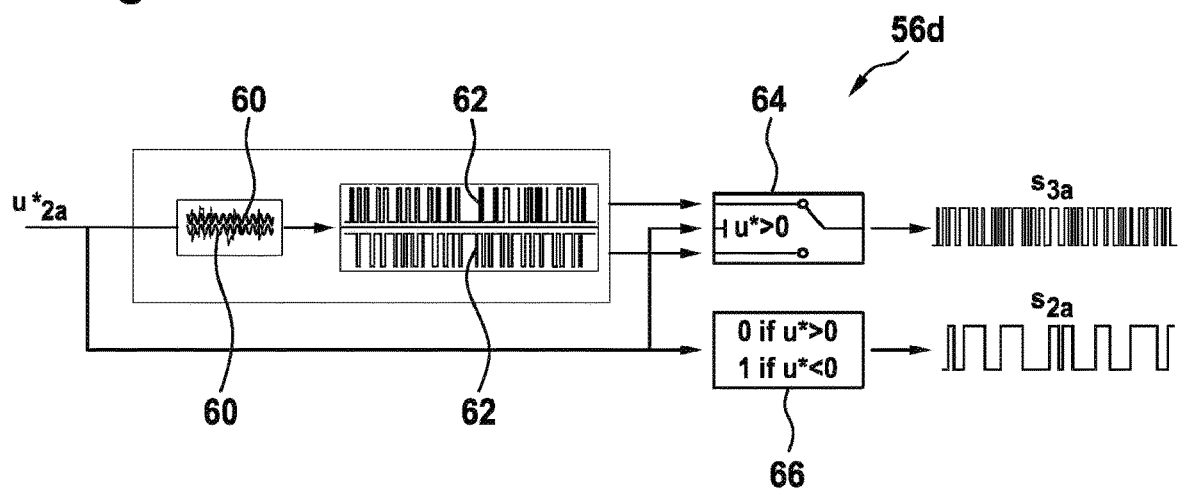
FIG. 11 shows a diagram illustrating a part of FIG. 10 in more detail.

FIGS. 10 and 11 describe a controller 16 and a method, in which the half-bridges of a converter cell 14c are switched with different switching signals $s_{2abc}$, $s_{3abc}$. The example of FIGS. 10 and 11 refers to a controller 16 with the main converter 12 connected to a converter cell 14c as shown in FIG. 3B. For one or more additional converter cells 14a between the main converter 12 and the converter cell 14c, more pulse width modulation stages 56b may be added to the controller 16 as described with respect to FIGS. 7 and 9.

The converter cell 14c may be a hybrid converter cell, with different types of semiconductor switches 24', 24", which half-bridges 34a, 34b operate at different switching frequencies. For example, one half-bridge 34a may be operated at a first, for example, medium switching frequency by a switching signal $s_{2abc}$, using Si-based switches 24', and the second half-bridge 34b may be operated at a higher switching frequency by a switching signal $s_{3abc}$, using SiC-based switches 24".

With respect to FIG. 10, the first, low-frequency pulse width modulation stage 56a may be designed as described with respect to FIG. 9 (or alternatively with respect to FIG. 7). The pulse width modulation stage 56d generates two switching signals $s_{2abc}$, $s_{3abc}$. The modulating signal $u^*_{2abc}$ is unevenly distributed between the two half-bridges 34a, 34b with an asymmetric modulation process, which is described for one component with respect to FIG. 11.

The modulation process of the pulse width modulation stage 56d may be implemented with two phase-disposition carriers. Whenever the modulating signal $u^*_{2a}$ is in the upper half ($u^*>=0$), the switching signal $s_2$, for the medium-frequency half-bridge 34a is set to 0 (add voltage), if it is in the lower half ($u^*<0$), the signal is set to 1 (subtract voltage) (see block 66).

For the modulation of the high-frequency half-bridge 34b, the modulating signal $u^*_{2a}$ is compared to high-frequency triangular carrier waveforms. The switching signal $s_{3a}$ is set to 1 if the modulating signal $u^*_{2a}$ exceeds the carrier 60 in the upper half for ($u^*>=0$) or if the modulating signal $u^*_{2a}$, exceeds the carrier 60 in the lower half for ($u^*<0$). Otherwise, the switching signal $s_{3a}$ is set to 0. This may be achieved by generating two switching signals 62 from the carrier signals 60 and to select the appropriate one with a selector 64, which selects the first signal 62, when the modulating signal $u^*_{2a}$ is in the upper half ($u^*>=0$), or the second signal 62, when the modulating signal $u^*_{2a}$, is in the lower half ($u^*<0$).

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practising the claimed invention, from a study of the drawings, the disclosure, and the appended claims. In the claims, the word "comprising" does not exclude other elements or steps, and the indefinite article "a" or "an" does not exclude a plurality. A single processor or controller or other unit may fulfil the functions of several items recited in the claims. The mere fact that certain measures are recited in mutually different dependent claims does not indicate that a combination of these measures

The invention claimed is:

1. A method for operating an electrical converter,
the electrical converter comprising a main converter for generating a first output voltage and a first converter cell for converting the first output voltage into a second output voltage, wherein the electrical converter comprises a second converter cell for converting the second output voltage into a third output voltage,
wherein the first converter cell comprises a first half-bridge for receiving the first output voltage and a second half-bridge for providing the second output voltage;
the method comprising:
receiving a reference voltage for the electrical converter;
pulse width modulating the reference voltage with a first modulation frequency for generating a first switching signal for the main converter;
switching the main converter with the first switching signal to generate the first output voltage;
estimating the first output voltage from the first switching signal;
determining a first voltage error by subtracting the estimated first output voltage from the reference voltage;
pulse width modulating the first voltage error with a second modulation frequency, which is higher than the first modulation frequency, for generating a further switching signal for the first converter cell;
switching the first converter cell with the further switching signal to generate the second output voltage;
estimating the second output voltage from the further switching signal, which is a second switching signal;
determining a second voltage error by subtracting the estimated second output voltage from the first voltage error;
pulse width modulating the second voltage error with a third modulation frequency, which is higher than the second modulation frequency, for generating a third switching signal for the second converter cell;
switching the second converter cell with the third switching signal to generate the third output voltage;
generating the second switching signal from the first voltage error, wherein the second switching signal is 0, if the first voltage error is higher than 0, and the second switching signal is 1, if the first voltage error is lower than 0;
switching the first half-bridge with the second switching signal;
pulse width modulating the first voltage error with an upper carrier signal for generating an upper third switching signal and with a lower carrier signal for generating a lower third switching signal, wherein the upper carrier signal sweeps a positive voltage range and the lower carrier signal sweeps a negative voltage range;
selecting the upper third switching signal, if the first voltage error is higher than 0, and selecting the lower third switching signal, if the first voltage error is lower than 0; and
switching the second half-bridge with the third switching signal for generating the second output voltage.

2. The method of claim 1, wherein the second modulation frequency is at least 5 times higher than the first modulation frequency.

3. The method of claim 2,
wherein a second reference voltage is provided in a stationary orthogonal coordinate system and converted into a three-phase coordinate system;
wherein the first switching signal is generated from the reference voltage in the three-phase coordinate system and the first output voltage is estimated in the three-phase coordinate system;
wherein the estimated first output voltage is transformed into the stationary orthogonal coordinate system; and
wherein the first voltage error is determined by subtracting the estimated first output voltage from the second reference voltage in the stationary orthogonal coordinate system.

4. The method of claim 3,
wherein the second reference voltage comprises a common mode reference voltage component.

5. The method of claim 1,
wherein a second reference voltage is provided in a stationary orthogonal coordinate system and converted into a three-phase coordinate system;
wherein the first switching signal is generated from the reference voltage in the three-phase coordinate system and the first output voltage is estimated in the three-phase coordinate system;
wherein the estimated first output voltage is transformed into the stationary orthogonal coordinate system; and
wherein the first voltage error is determined by subtracting the estimated first output voltage from the second reference voltage in the stationary orthogonal coordinate system.

6. The method of claim 5, wherein the second reference voltage comprises a common mode reference voltage component.

7. An electrical converter, comprising:
a main converter for generating a first output voltage and a first converter cell for converting the first output voltage into a second output voltage, the electrical converter comprises a second converter cell for converting the second output voltage into a third output voltage, wherein the first converter cell comprises a first half-bridge for receiving the first output voltage and a second half-bridge for providing the second output voltage; and
a controller, the controller configured to at least instruct the electrical converter to:
receive a reference voltage for the electrical converter;
pulse width modulate the reference voltage with a first modulation frequency for generating a first switching signal for the main converter;
switch the main converter with the first switching signal to generate the first output voltage;
estimate the first output voltage from the first switching signal;
determine a first voltage error by subtracting the estimated first output voltage from the reference voltage;
pulse width modulate the first voltage error with a second modulation frequency, which is higher than the first modulation frequency, for generating a further switching signal for the first converter cell;
switch the first converter cell with the further switching signal to generate the second output voltage;
estimate the second output voltage from the further switching signal, which is a second switching signal;
determine a second voltage error by subtracting the estimated second output voltage from the first voltage error;

pulse width modulate the second voltage error with a third modulation frequency, which is higher than the second modulation frequency, for generating a third switching signal for the second converter cell;

switch the second converter cell with the third switching signal to generate the third output voltage;

generate the second switching signal from the first voltage error, wherein the second switching signal is 0, if the first voltage error is higher than 0, and the second switching signal is 1, if the first voltage error is lower than 0;

switch the first half-bridge with the second switching signal;

pulse width modulate the first voltage error with an upper carrier signal for generating an upper third switching signal and with a lower carrier signal for generating a lower third switching signal, wherein the upper carrier signal sweeps a positive voltage range and the lower carrier signal sweeps a negative voltage range;

select the upper third switching signal, if the first voltage error is higher than 0, and selecting the lower third switching signal, if the first voltage error is lower than 0; and switch the second half-bridge with the third switching signal for generating the second output voltage.

8. The electrical converter of claim 7, wherein the main converter is one of:
a two-level converter;
a three-level neutral point clamped converter; or
a three-level T-type converter.

9. The electrical converter of claim 8,
wherein the first half-bridge comprises Si semiconductor switches; and
wherein the second half-bridge comprises SiC semiconductor switches.

10. The electrical converter of claim 9,
wherein the first converter cell comprises Si semiconductor switches; and
wherein the second converter cell comprises SiC semiconductor switches.

11. The electrical converter of claim 9,
wherein the main converter is a three-phase converter with three main converter phase outputs.

12. The electrical converter of claim 8,
wherein the first converter cell comprises Si semiconductor switches; and
wherein the second converter cell comprises SiC semiconductor switches.

13. The electrical converter of claim 8,
wherein the main converter is a three-phase converter with three main converter phase outputs.

14. The electrical converter of claim 7,
wherein the first converter cell comprises Si semiconductor switches; and
wherein the second converter cell comprises SiC semiconductor switches.

15. The electrical converter of claim 14,
wherein the main converter is a three-phase converter with three main converter phase outputs.

16. The electrical converter of claim 7,
wherein the main converter is a three-phase converter with three main converter phase outputs.

17. The electrical converter of claim 16,
wherein the three main converter phase outputs are connected to a passive filter; or
wherein the three main converter phase outputs are connected with an electrical machine with three galvanically separated windings, which are connected via a further converter.

18. A controller for an electrical converter, the electrical converter comprising a main converter for generating a first output voltage and a first converter cell for converting the first output voltage into a second output voltage, the electrical converter comprises a second converter cell for converting the second output voltage into a third output voltage, wherein the first converter cell comprises a first half-bridge for receiving the first output voltage and a second half-bridge for providing the second output voltage, the controller configured to at least instruct the electrical converter to:

receive a reference voltage for the electrical converter;

pulse width modulate the reference voltage with a first modulation frequency for generating a first switching signal for the main converter;

switch the main converter with the first switching signal to generate the first output voltage;

estimate the first output voltage from the first switching signal;

determine a first voltage error by subtracting the estimated first output voltage from the reference voltage;

pulse width modulate the first voltage error with a second modulation frequency, which is higher than the first modulation frequency, for generating a further switching signal for the first converter cell;

switch the first converter cell with the further switching signal to generate the second output voltage;

estimate the second output voltage from the further switching signal, which is a second switching signal;

determine a second voltage error by subtracting the estimated second output voltage from the first voltage error;

pulse width modulate the second voltage error with a third modulation frequency, which is higher than the second modulation frequency, for generating a third switching signal for the second converter cell;

switch the second converter cell with the third switching signal to generate the third output voltage;

generate the second switching signal from the first voltage error, wherein the second switching signal is 0, if the first voltage error is higher than 0, and the second switching signal is 1, if the first voltage error is lower than 0;

switch the first half-bridge with the second switching signal;

pulse width modulate the first voltage error with an upper carrier signal for generating an upper third switching signal and with a lower carrier signal for generating a lower third switching signal, wherein the upper carrier signal sweeps a positive voltage range and the lower carrier signal sweeps a negative voltage range;

select the upper third switching signal, if the first voltage error is higher than 0, and selecting the lower third switching signal, if the first voltage error is lower than 0; and switch the second half-bridge with the third switching signal for generating the second output voltage.

* * * * *